(No Model.)

D. C. RICE.
ANIMAL POKE.

No. 270,843. Patented Jan. 16, 1883.

WITNESSES
Villette Anderson.
Emory H. Bates.

INVENTOR
Darius C. Rice,
by Anderson & Smith
his Attorneys

UNITED STATES PATENT OFFICE.

DARIUS C. RICE, OF LITCHFIELD, MICHIGAN, ASSIGNOR TO JOHN H. STODDARD AND ALBERT J. LOVEJOY, OF SAME PLACE.

ANIMAL-POKE.

SPECIFICATION forming part of Letters Patent No. 270,843, dated January 16, 1883.

Application filed July 29, 1882. (No model.)

*To all whom it may concern:*

Be it known that I, DARIUS C. RICE, a citizen of the United States, and a resident of Litchfield, in the county of Hillsdale and State of Michigan, have invented a new and valuable Improvement in Animal-Pokes; and I do hereby declare that the following is a full, clear, and exact description of the construction and operation of the same, reference being had to the annexed drawings, making a part of this specification, and to the letters and figures of reference marked thereon.

Figure 1:
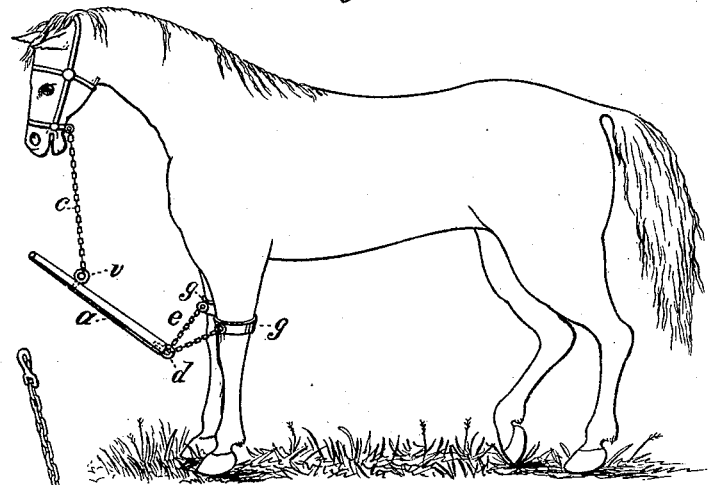
Figure 2:
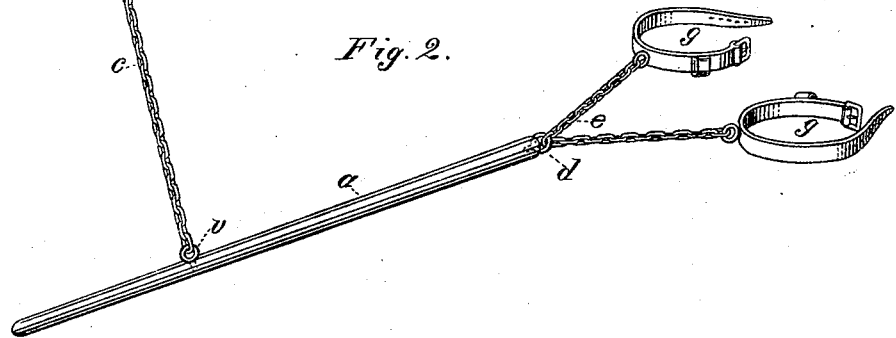

Figure 1 of the drawings is a representation of this invention, showing it applied to a horse. Fig. 2 is a perspective view.

This invention has relation to hopples or animal-pokes; and it consists in the construction and novel arrangement of a straight wooden rod or stick connected by its front end to a strap or chain from the halter, and provided at its rear end with a transverse chain, the ends of which are strapped to the fore legs of the animal, all as hereinafter set forth.

In the accompanying drawings, the letter $a$ designates a straight wooden rod or stick having near its front end a staple, $b$, whereby a strap or chain, $c$, from the halter is attached. To an eye or staple, $d$, in the rear end of the stick is connected the transverse chain $e$ by its middle part, its ends or branches being connected to the fore legs of the animal by straps $g$.

This hopple is easily adjusted and will not injure the animal. It does not interfere with its movements in grazing, but will effectually check ranging and jumping fences.

An animal-poke in which a saddle concaved to fit the under side of the body of the horse has been secured in place by a strap passing over the horse's back. A mortise made in the saddle receives one end of a slotted arm, in the slotted forward end of which a longer arm has been pivoted to rise to a horizontal position, but not farther, owing to a shoulder in the slot. This latter arm is placed between the fore legs of the horse and is connected to the headstall by a strap. It is not intended to cover this construction herein.

Having described this invention, what I claim and desire to secure by Letters Patent, is—

The animal-poke consisting of the straight wooden rod or stick $a$, connected by its front end to a strap or chain, $c$, from the halter, and having at its rear end a transverse chain, $e$, provided with leg-straps $g$, substantially as specified.

In testimony that I claim the above I have hereunto subscribed my name in the presence of two witnesses.

DARIUS C. RICE.

Witnesses:
  CHARLES T. FOWLER,
  WILLIAM C. WALTER.